(No Model.)
P. MEDART.
Split Belt Pulley.
No. 237,118. Patented Feb. 1, 1881.
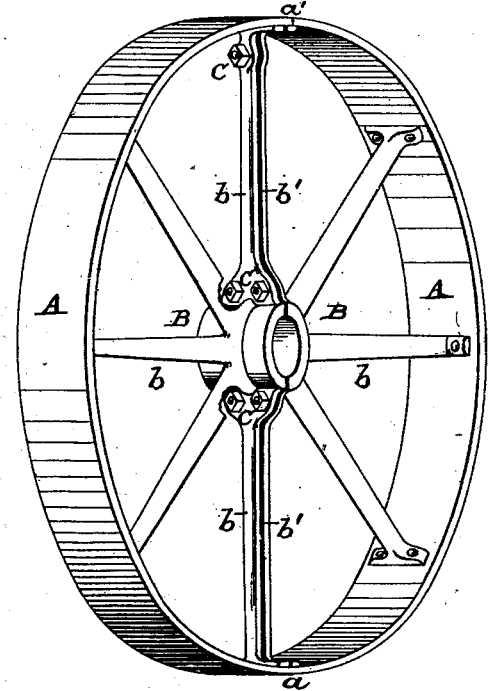
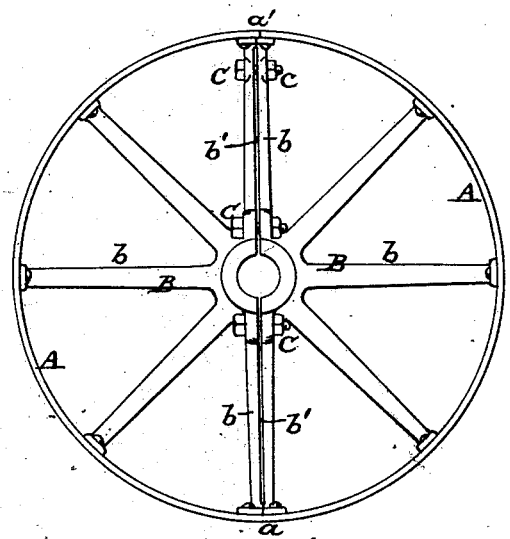
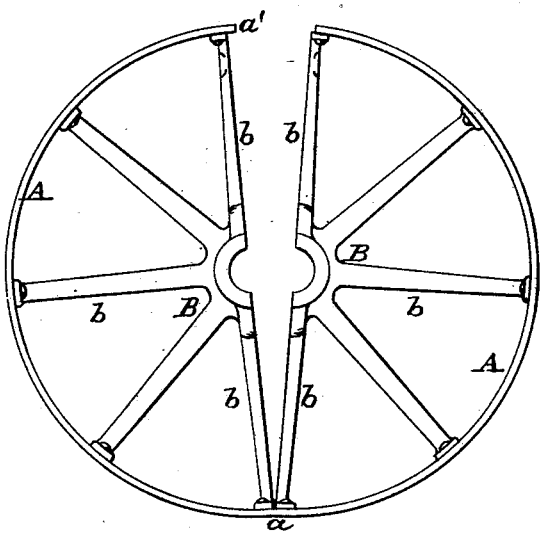
ATTEST:
Eugene Wolf
Paul H. Stange
INVENTOR:
Philip Medart

UNITED STATES PATENT OFFICE.

PHILIP MEDART, OF ST. LOUIS, MISSOURI, ASSIGNOR OF ONE-HALF TO WILLIAM MEDART, OF SAME PLACE.

SPLIT BELT-PULLEY.

SPECIFICATION forming part of Letters Patent No. 237,118, dated February 1, 1881.

Application filed September 9, 1880. (No model.)

*To all whom it may concern:*

Be it known that I, PHILIP MEDART, a citizen of the United States, and a resident of St. Louis, in the State of Missouri, have invented certain new and useful Improvements in Split Belt-Pulleys; and I do hereby declare that the following is a full, clear, and exact description of the same, reference being had to the accompanying drawings, forming a part of this specification.

This invention relates to certain improvements in the mode of constructing belt-pulleys as patented to me by Reissue Letters Patent No. 8,909, dated September 30, 1879, and has for its object the production of a cheap, durable, and effective halved or split pulley for use in the arts upon shafting that is already up and where it is difficult to apply the ordinary whole pulley; and this invention consists in forming the cast-metal spider or center of the pulley in two halves, to the arms of which a wrought-metal rim is attached, the line of division being through two of the arms.

In the accompanying drawings, in which similar letters of reference indicate like parts, Figure 1 is a perspective view, illustrating my invention. Fig. 2 is a side view, showing the pulley with an even number of arms in a closed position. Fig. 3 is a similar view in an open position.

The rim A is formed of a flat sheet of metal riveted to bracket-lugs at the ends of the arms $b$ of the cast-metal spider B, as in my former patent above referred to. The spider in my present improvement is cast in two halves, with the line of division through two of the arms $b$, as shown in Figs. 1, 2, and 3, and the hub-sections will be provided with independent bracket-lugs $c$ for reception of the bolts, as shown. A space, $b'$, is left between the half-arms and hubs, so as to allow for the better clamping of the parts around the shafting to which the pulley is applied. The object of forming the line of division of the spider through the arms, as above described, is for the purpose of furnishing a bearing for the ends of the metal rim, as will be clearly understood by an inspection of the drawings. At one end of the line of division of the spider the two ends of the rim A meet, so as to allow the two halves of the spider to be sprung into position, when it is desired to place the pulley on a shaft, the springing open of the parts being allowed by the natural elasticity of the rim at the point $a$.

C are bolts for securing the two halves of the spider or center B together around the shafting. These are preferably arranged as shown; but any other desired arrangement of bolts may be used, as also any other mode of fastening, without departing from the spirit of my invention.

The end $a'$ of the rim A is preferably arranged to lap past the line of division of the spider, as indicated in Fig. 2, so as to form a stiff and perfect joint at that point.

Having thus fully described my said invention, what I claim as new, and desire to secure by Letters Patent, is—

1. A split belt-pulley having a rim of wrought metal and a cast-metal spider formed in halves with the line of division through two of the arms, as described, and for the purpose set forth.

2. The combination, in a split pulley, of the spider B, when provided with a space, $b'$, as described, and for the purpose set forth.

PHILIP MEDART.

Witnesses:
EUGENE WOLF,
WILLIAM MEDART.